Figure 1:
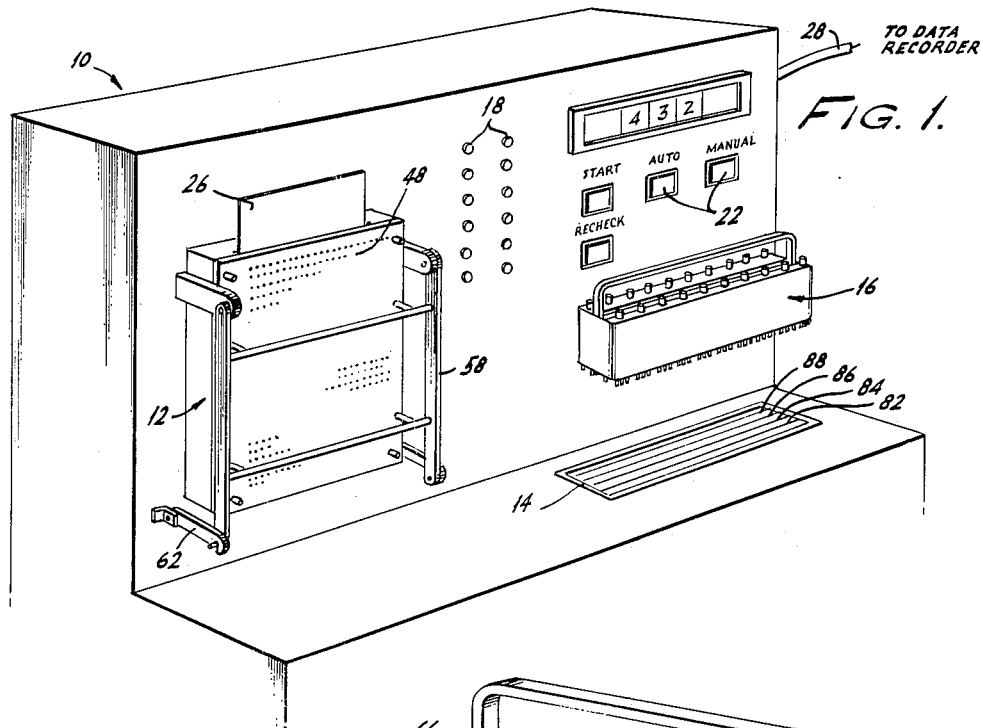

Feb. 15, 1966  S. J. BOSCIA ETAL  3,235,797
RECORD CONTROLLED TEST SET AND MAGAZINE THEREFOR
HAVING FRANGIBLE FINGER ENCODING MEANS
Filed April 3, 1961  3 Sheets-Sheet 1

INVENTORS
SALVATORE J. BOSCIA
WILLIAM L. SCOLNIK
BY
Robert D. Sanborn
ATTORNEY

Feb. 15, 1966    S. J. BOSCIA ETAL    3,235,797
RECORD CONTROLLED TEST SET AND MAGAZINE THEREFOR
HAVING FRANGIBLE FINGER ENCODING MEANS
Filed April 3, 1961    3 Sheets-Sheet 2

INVENTORS
SALVATORE J. BOSCIA
WILLIAM L. SCOLNICK
BY
Robert D. Sanborn
ATTORNEY

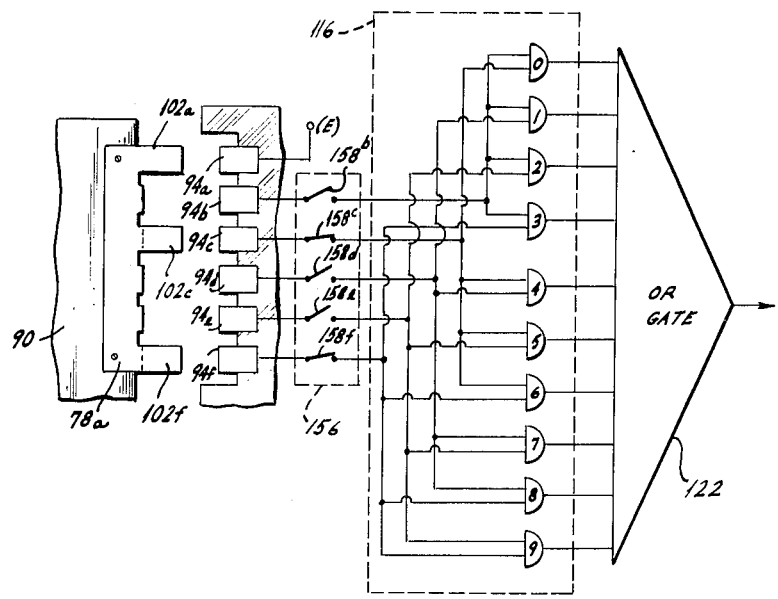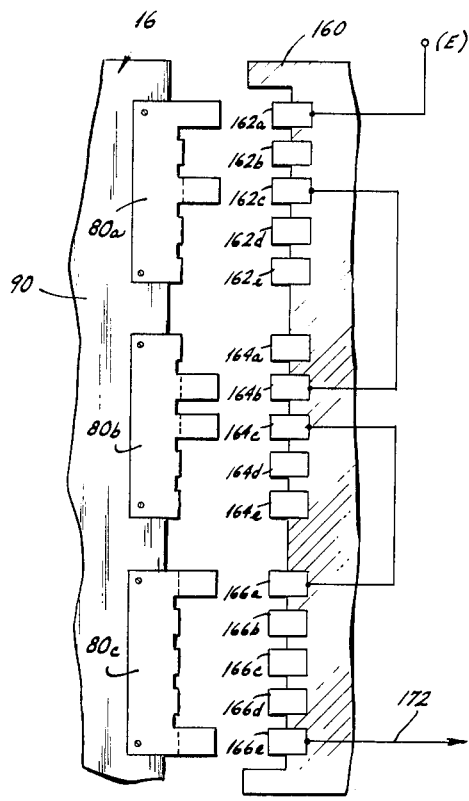

United States Patent Office 3,235,797
Patented Feb. 15, 1966

3,235,797
RECORD CONTROLLED TEST SET AND MAGAZINE THEREFOR HAVING FRANGIBLE FINGER ENCODING MEANS
Salvatore J. Boscia, Norristown, Pa., and William L. Scolnik, New York, N.Y., assignors, by mesne assignments, to Philco Corporation, Philadelphia, Pa., a corporation of Delaware
Filed Apr. 3, 1961, Ser. No. 100,452
8 Claims. (Cl. 324—73)

The present invention relates to component testing devices and more particularly to interlocking means for high precision, record-controlled testing devices.

In the performance testing of new circuit components, for example new transistor types, it is necessary to subject several thousand components of the new type to test procedures such as operating tests, storage life tests and elevated temperature life tests. Each component must be checked periodically to determine if any change has occurred in any significant parameter. It has been found in practice that, in testing transistors, if each transistor to be tested is individually removed from the life test racks and connected to a test set which is manually adjusted by the operator, the number of transistor failures caused by mishandling by the operator and misadjustment of the test equipment may far exceed the failure rate due to inherent defects in the transistors. For this and other reasons such as speed and efficiency in testing, it has been found desirable to permanently mount groups of circuit components to be tested in magazines which may be plugged into appropriate life test racks and parameter testing equipment without disconnecting the leads of the individual components under test. As a further safeguard against operator error, programming of the parameter test equipment is achieved semi-automatically by means of a suitable test controlling record, for example a punched card. In general, a different control record will be required for each different type of component tested.

In the semi-automatic testing procedure outlined above there is still the possibility that the operator will select the wrong record card for the component to be tested or will insert the component carrying magazine in the wrong position in the life rack.

Objects

Therefore it is an object of the present invention to provide a magazine-receiving, record-controlled component testing device with novel interlocking means between the controlling record and the magazine.

A further object of the present invention is to provide a magazine-receiving, record-controlled component testing device with means for comparing classification identifying means of a received magazine with classification identifying means contained on the test controlling record.

An additional object of the present invention is to provide a magazine for use with test equipment, life racks and the like which has passive magazine identifying means adapted to interlock with control circuitry in said test equipment, life racks and the like.

Still another object of the present invention is to provide a novel passive magazine identifying means which may be readily and unalterably set to a selected magazine identifying state.

Summary

Briefly, the invention comprises a magazine for holding the circuit components to be tested. This magazine is provided with a plurality of contacts for connection to the terminals of the component to be tested and additional contact fingers coded to identify the magazine. An associated record-controlled test set is provided with contacts arranged to mate with the contacts and contact fingers of the magazine. The test set receives and is controlled by a record. The record includes record identifying indicia in addition to test controlling indicia. The test set includes circuit means responsive to the record identifying indicia on the record and the identifying contact fingers of the magazine for providing an indication upon a selected correspondence between the data represented by the identifying contact fingers of the magazine and the data represented by the record identifying indicia on the record.

For a better understanding of the present invention together with other and further objects thereof reference should now be made to the following detailed description which is to be read in conjunction with the accompanying drawings.

Drawings

Figure 3:
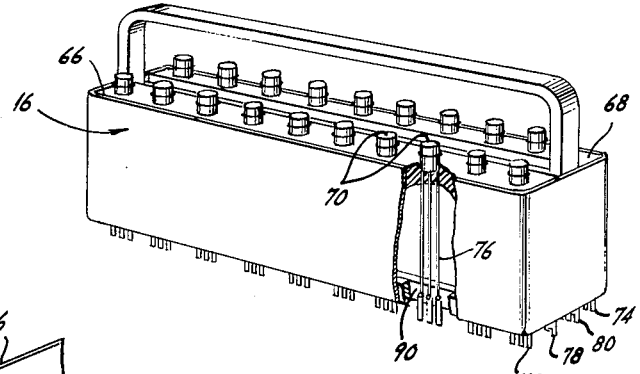
Figure 4:
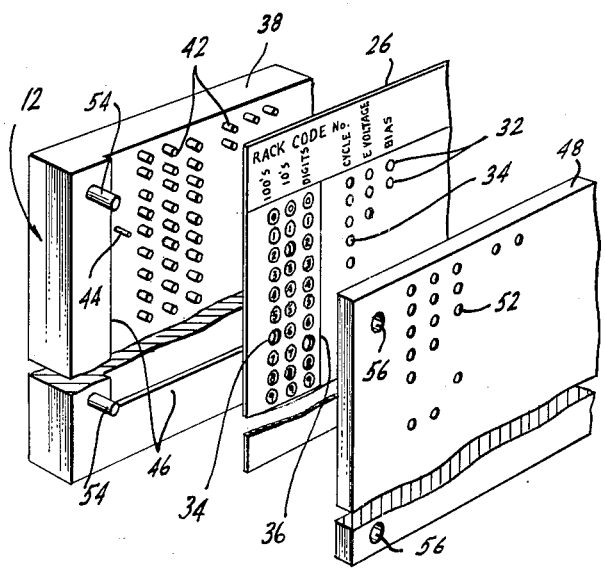
Figure 2:
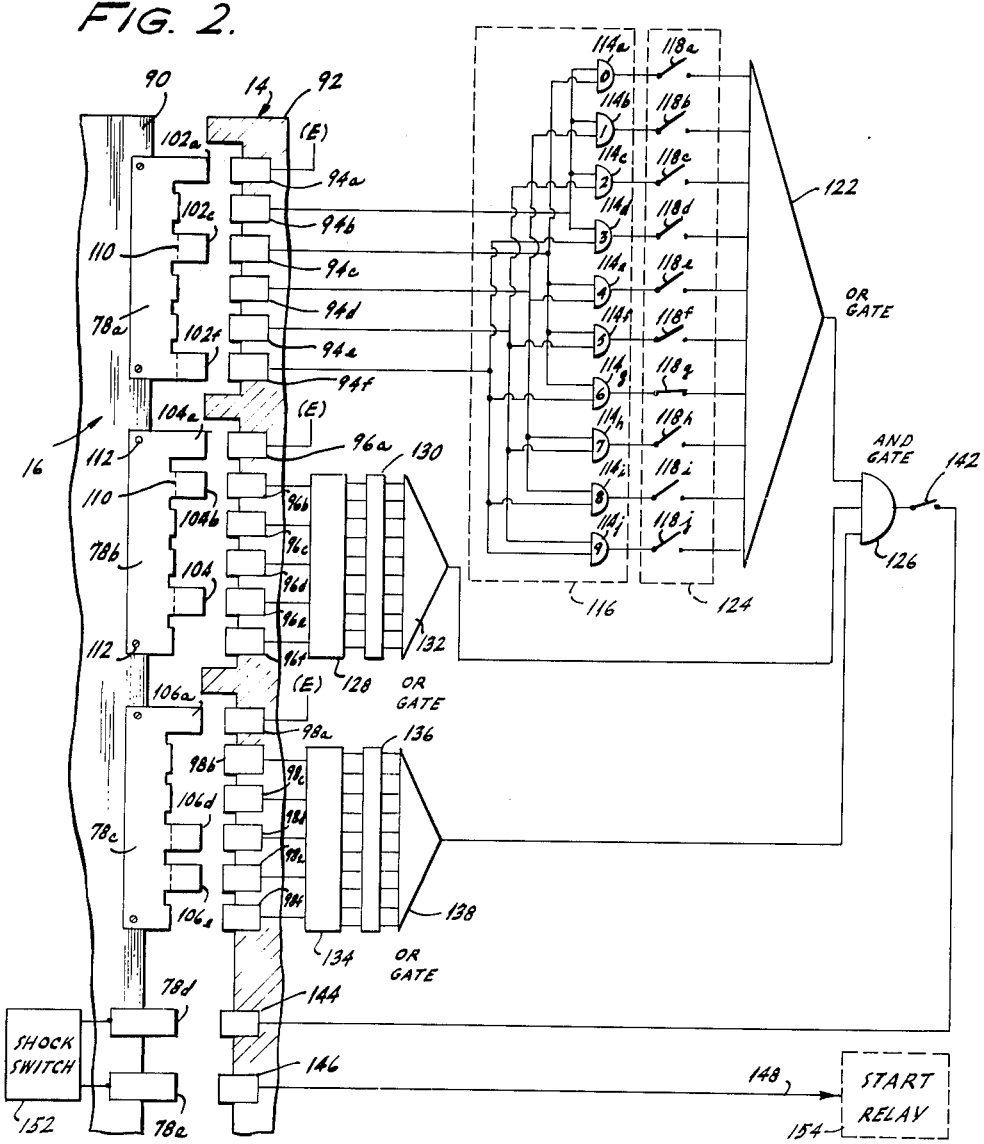
Figure 2A:
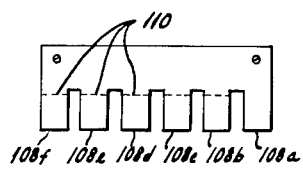
Figure 2B:
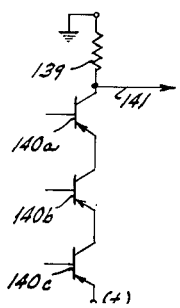

In the drawings:
FIG. 1 is a pictorial view of a magazine-receiving, record-controlled test set showing the magazine and the controlling record;
FIG. 2 is a schematic drawing partially in block form of the novel interlocking circuit of the present invention;
FIG. 2A is a detailed view of one preferred form of identifying contact member for use with a component receiving magazine;
FIG. 2B is a schematic diagram of a three-input "and" gate employed in the circuit of FIG. 2;
FIG. 3 is a detailed pictorial view of the component receiving magazine of the present invention;
FIG. 4 is a fragmentary, detailed view of one form of record and record receiving means;
FIG. 5 is a schematic diagram partly in block form of an alternative interlocking circuit arrangement; and
FIG. 6 is a fragmentary view showing an interlocking circuit for non-programmed test equipment such as life test racks and the like.

FIGS. 1 and 4

Component test set 10 of FIG. 1 includes a record receiving means 12 and a magazine receiving socket 14. The component carrying magazine is shown at 16. The test set 10 may be provided with suitable indicator lights 18, control buttons 22 and data readout devices such as the digital voltmeter 24. In general the control buttons 22 will control only general testing functions such as the starting, stopping and recycling of the test equipment. The detailed test conditions such as the voltage, currents, etc. supplied to the components to be tested are controlled by a suitable record 26 in record receiving means 12. Usually the components will be tested one at a time in a selected sequence. Lights 18 may be connected to indicate the component being tested. Test data may be monitored visually of means of readout device 24. However the test data is preferably recorded automatically by a suitable data recorder connected to output connection 28. Since the present invention is concerned mainly with the novel means for interlocking the magazine 16 with a socket such as socket 14 and/or with a test controlling record such as record 26, the component test circuits per se will not be described further.

The record 26 shown in FIGS. 1 and 4 is a card having indicia locations 32 arranged in a regular pattern of rows and columns. Holes are punched at selected indicia locations such as 34 to represent certain data which will be recognized or read by the test set 10. For example, a certain combination of holes punched in one column may cause a preselected voltage to be applied between selected terminals of the component under test. In the example chosen for illustration in the drawings, it will be assumed that three columns of 10 indicia locations each in the upper left-hand corner of the record 26, within the area bounded by line 36, are reserved for record identifying data and that the remaining indicia locations are available for specifying test controlling data.

The record receiving means 12 shown in FIGS. 1 and 4 comprises a base plate 38 on which are mounted a plurality of plunger actuated, single pole, single throw switches, only the plungers 42 of which are visible in FIG. 4. One switch is provided for each indicia location on record 26. An additional plunger actuated switch 44 is provided for sensing the presence of a card in record receiver 12. Base plate 38 is provided with a raised border 46 around three sides (only two sides of which are shown in FIG. 4) for accurately positioning the record 26 with respect to the switch plungers 42 and 44. A perforated backing plate 48 is provided for pressing record 26 against the switch plungers 42 and 44. In the absence of record 26 or at a perforation in record 26, the switch plungers 42 will extend into the openings 52 in perforated back plate 48. The openings 52 in back plate 48 are maintained in proper alignment with switch plungers 42 and 44 by means of locating pins 54 on base plate 38 and locating holes 56 in back plate 48. Turning to FIG. 1 it will be seen that a manually operative clamping means 58 is provided for pressing back plate 48 and record 26 against plungers 42. A suitable release latch 62 is provided for maintaining clamping means 58 in a clamped position.

FIG. 3

The component receiving magazine 16 is shown in detail in FIG. 3. Suitable insulating bases 66 and 68 are provided for receiving components 70. Magazine 16 is provided with a series of contact members 72 which are arranged to contact the electrode leads of the components 70. A portion of the wall of magazine 16 has been broken away to show the connection between the leads of one of the components 70 and three of the contacts 72. A second row of contacts 74 is provided for receiving the electrode leads of components mounted on strip 68. Preferably the connections between the components 70 and the terminals 72 are so arranged that it is impossible to make any change in these connections without entirely disassembling the magazine 16.

The magazine 16 is provided with one or more additional rows of contacts for interlocking and otherwise controlling the operation of test equipment with which magazine 16 is associated. Two rows of contacts 78 and 80 have been shown by way of example. The arrangement of certain of the contacts 78 and 80 are shown in more detail in FIGS. 2, 5 and 6.

Turning once again to FIG. 1, the magazine receiving socket 14 is provided with four rows of slots 82, 84, 86 and 88 for receiving contacts 72, 78, 80 and 74, respectively.

FIG. 2

FIG. 2 shows in detail the circuit which interlocks the record 26 with magazine 16. In FIG. 2, member 90 is the insulating member of magazine 16 on which contacts 78 and 80 are mounted. The hatched portion 92 represents an insulating portion of the magazine receiving socket 14 of FIG. 1. Contacts $94^a$–$94^f$, $96^a$–$96^f$ and $98^a$–$98^f$ of socket 14 represent contacts which are disposed in one of the sets of slots 84 and 86 of FIG. 1, for example slot 84.

The contact members which are represented only generally at 78 in FIG. 3 are seen to comprise a plurality of electrically isolated bridging strips $78^a$, $78^b$, and $78^c$. Contact member $78^a$ is provided with three contact fingers $102^a$, $102^c$ and $102^f$ which are adapted to mate with contacts $94^a$, $94^c$ and $94^f$ when magazine 16 is plugged into socket 14. It is convenient to assume that contact fingers $102^c$ and $102^f$ provide a representation in a bi-quinary code of one decimal digit of a selected classification or serial number of magazine 16. However as will be understood by those skilled in the art, the operation of the circuit is not affected by the particular symbol selected to identify the code group. Similarly, contact member $78^b$ is provided with contact fingers $104^a$, $104^b$ and $104^e$ to represent a second decimal digit and contact member $78^c$ is provided with contact fingers $106^a$, $106^d$ and $106^e$ to represent a third digit. While three contact members $78^a$, $78^b$ and $78^c$ have been shown, it is to be understood that the number may be made greater or less than three as the situation demands.

It is desirable that the contact members $78^a$, $78^b$ and $78^c$ be readily encoded at the time that the components 70 are mounted on the magazine and thereafter be incapable of change without disassembly of the magazine 16. One convenient way of achieving this end is to initially from each of the contact members $78^a$, $78^b$ and $78^c$ with six contact fingers as shown at $108^a$–$108^f$ in FIG. 2A. Each of the contact fingers $108^b$–$108^f$ is provided with a frangible region adjacent the base thereof such that said contact fingers may be selectively broken away manually at their bases without damage to the magazine. This frangible region is represented by the broken line 110 in FIGS. 2 and 2A. The contact member may then be made to represent the selected code by breaking away one or more of the contact fingers $108^b$–$108^f$. In the example chosen for illustration in FIG. 2, three contact fingers are broken away on each of the contact members $78^a$, $78^b$ and $78^c$. The contact members $78^a$, $78^b$ and $78^c$ may be mechanically secured to member 90 in any convenient fashion such as embedding, or fastening by screws or rivets as at 112 in FIG. 2 or by a combination of such means.

Contacts $94^a$, $96^a$ and $98^a$ of a socket 14 are connected to a suitable source of gate control potential represented by the symbol (E) adjacent the lead associated with these three contacts. Contacts $94^b$–$94^f$ are each connected to one input of four of the two-input "and" gates or coincidence circuits in the group $114^a$–$114^j$. The ten "and" gates $114^a$–$114^j$ together form a bi-quinary-to-decimal decoding network 116. The output of "and" gates $114^a$–$114^j$ are connected through ten normally closed single pole switches $118^a$–$118^j$, respectively, to the ten inputs of an "or" gate or buffer circuit 122. Switches $118^a$–$118^f$ and $118^h$–$118^j$ are shown in their actuated or open position. Switch $118^g$ is shown in its normal or closed position. Switches $118^a$–$118^j$, which are collectively identified as switch bank 124, may correspond to the upper left column of ten switches associated with the switch plungers 42 of FIG. 4. The single output of "or" gate 122 is connected to one input of a three-input "and" gate or coincidence circuit 126.

Contacts $96^b$–$96^f$ of socket 14 are coupled to a second input of "and" gate 126 by way of decoder network 128, switch bank 130 and "or" gate 132 which may be identical to decoder network 116, switch bank 124 and "or" gate 122, respectively. A similar channel including decoder network 134, switch bank 136 and "or" gate 138 couple contacts $98^d$–$98^f$ to the third input of "and" gate 126.

One form which "and" gate 126 may take is shown in FIG. 2B. A resistor 139 and three transistors $140^a$, $140^b$ and $140^c$ are connected in cascade between ground and a source of positive potential represented by the symbol (+). The output potential on output lead 141 is thus the drop across resistor 139. The base connections to the three transistors $140^a$, $140^b$ and $140^c$ comprise the three inputs to "and" gate 126. Thus it will be seen that output lead 141 will be at substantially ground potential unless all three transistors $140^a$, $140^b$ and $140^c$ receive a suitable actuating potential on their respective base connections. "And" gates $114^a$–$114^j$ may be similar to the gate circuit shown in FIG. 2B except that only two transistors are required since gates $114^a$–$114^j$ have only two inputs.

The output of "and" gate 126 is connected through a normally open switch 142, which is shown in its actuated or closed position, to a contact 144. Switch 142 is the switch associated with actuating plunger 44 of FIG. 4.

Contact 144 mates with a single contact finger 78$^d$ on magazine 16. A second single contact finger 78$^e$ on magazine 16 mates with a contact 146 on socket 14. Contact 146 connects to the output lead 148 of the interlock circuit of FIG. 2. A shock actuated switch 152 is connected between contact fingers 78$^d$ and 78$^e$ in magazine 16. Switch 152 is a normally closed switch which is designed to open and remain open if magazine 16 is jarred excessively. One preferred form of switch of this type is shown in the co-pending application of Marvin A. Leedom, Serial No. 99,155, filed March 29, 1961, now Patent No. 3,138,795. Output lead 148 may be connected to a start relay 154 or other suitable control device in test circuit 10.

FIGS. 1 to 4—Operation of system

The interlock circuit just described operates in the following manner. Magazine 16 is plugged into socket 14 so that the contacts and contact fingers on magazine 16 mate with corresponding contacts in socket 14. The test control record 26 is inserted into record receiving means 12. Back plate 48 and record 26 are urged toward base plate 38 by clamping means 58. Clamping means 58 is held in its clamping position by latch 62. If the coding of contact members 78$^a$, 78$^b$ and 78$^c$ of FIG. 1 corresponds in some selected manner to the indicia arrangement within the line 36 of FIG. 4 and if switches 142 and 152 are closed, a selected potential or signal will appear on output lead 148. This potential or signal may be employed as an unlocking signal in test set 10 which permits the test set to proceed with the tests indicated by record 26.

In the example chosen for illustration in the drawings, it will be assumed that record 26 is given the serial number 627 by punching holes at the indicia location 6 in the first column, indicia location 2 in the second column and indicia location 7 in the third column within line 36 of FIG. 4. Additional holes will be punched at selected indicia locations in record 26 outside the line 36 in order to establish the desired test conditions. However, as mentioned before, the test circuits per se are not described in detail herein.

The normally closed switches 118$^a$–118$^f$ and 118$^h$–118$^j$ are held in their actuated or open position by the pressure of record 26 on the corresponding plungers 42. The plunger 42 on switch 118$^g$ extends through the punched hole 34 in the left-hand column of indicia locations 32 of record 26 and into the corresponding hole 52 of back plate 48. Thus switch 118$^g$ is permitted to remain in its normal or closed position. Plunger 44 is depressed by record 26 so that normally open switch 142 of FIG. 2 is in its actuated or closed position.

When the contact fingers 102$^a$, 102$^c$ and 102$^f$ of contact member 78$^a$ mate with the corresponding contacts 94$^a$, 94$^c$ and 94$^f$ of socket 14, an actuating potential is supplied by way of contact 94$^a$ and contact member 78$^a$ to contact members 94$^c$ and 94$^f$. One input of "and" gates 114$^a$, 114$^e$, 114$^f$ and 114$^g$ will be energized by way of contact 94$^c$. One input of "and" gates 114$^d$, 114$^g$, 114$^i$ and 114$^j$ will be energized by way of contact 94$^f$. Thus it will be seen that only "and" gate 114$^g$ will have both inputs energized. Since switch 118$^g$ is closed, a potential will be supplied from "and" gate 114$^g$ by way of switch 118$^g$ and "or" gate 122 to the first input of "and" gate 126.

In a similar manner, contacts 96$^b$ and 96$^e$ in FIG. 2 will be supplied with a potential by way of contacts 96$^a$ and contact member 78$^b$ of magazine 16. Since the decoding network 128 is identical to decoding network 116, it will be seen that energization of contacts 96$^b$ and 96$^e$ will result in an output signal being provided by the "and" gate in decoding network 128 corresponding to gate 114$^c$ in decoding network 116. If the corresponding switch in switch bank 130 is closed, an actuating potential will be supplied to the second input of "and" gate 126 by way of "or" gate 132. Similarly, the "and" gate in decoder network 134 corresponding to "and" gate 114$^h$ of decoder network 116 will provide an output signal. If the switch in switch bank 136 corresponding to switch 118$^h$ is permitted to remain closed by the hole 34 punched in the third column of record 26, a circuit will be completed in the third input of "and" gate 126. Since all three inputs of "and" gate 126 are energized, an output signal will be provided by this "and" gate. Switch 142 is maintained in its actuated or closed position by the pressure of record 26 on plunger 44. If shock switch 152 is in its normal or closed position, a circuit will be completed from the output of "and" gate 126 through switch 142 and switch 152 to the output lead 148. Preferably the test set 10 is so arranged that no potentials will be supplied to any of the components 70 to be tested unless a signal appears on output 148 of the interlock circuit.

It will be obvious that if the coding of contact fingers 78$^a$, 78$^b$ and 78$^c$ on magazine 16 does not correspond to the coding of the indicia locations 32 within line 36 of FIG. 4, then one or more of the three inputs to "and" gate 126 will remain unenergized and no output signal will appear on output connection 148.

FIG. 5

The interlock circuit shown in FIG. 2 has the advantage that the classification number of record 26 may be punched in decimal form in the three columns within line 36. However the classification number of 26 may be represented in a suitable bi-quinary code by providing three columns of five indicia locations each and punching two holes in each of the five columns. FIG. 5 shows an interlock circuit which can be operated with a bi-quinary record code of this type. Parts in FIG. 5 corresponding to like parts in FIG. 2 have been identified by corresponding reference numerals. It will be seen that the circuit of FIG. 5 is identical to the circuit of FIG. 2 except that the output of decoder network 116 is connected directly to the ten inputs of "or" gate 122 and a switch band 156 comprising five switches 158$^b$ to 158$^f$ is provided between contacts 94$^b$–94$^f$ and the inputs of the decoder network 116.

By suitable rearrangement of decoding network 116 other arrangements of the contact fingers on contact member 78$^a$ may be employed to activate any one output of the decoding network. Such arrangements may employ as few as two contact fingers or as many as six or more contact fingers.

FIG. 6

A circuit for interlocking magazine 16 with a socket such as socket 14 of the test set or a corresponding socket 160 of a life test rack or the like is shown in FIG. 6. It is assumed that contact members 80$^a$, 80$^b$ and 80$^c$ correspond to the contact members shown generally at 80 in FIG. 3. However it is to be understood that the physical positioning of contact members 80$^a$, 80$^b$ and 80$^c$ or the corresponding contact members 78$^a$–78$^e$ of FIG. 2 on magazine 16 is not critical. The contact member shown on the magazine 16 in FIG. 2 may occupy positions on either of the rows 78 and 80 or on both rows if this arrangement proves to be more convenient. Similarly, contact members 80$^a$, 80$^b$ and 80$^c$ are assumed to be located in row 80 but may in practice be located in either or both of rows 78 and 80.

The contact members 80$^a$, 80$^b$ and 80$^c$ are each provided with two contact fingers which occupy two of five possible positions. Again members 80$^a$, 80$^b$ and 80$^c$ may be initially formed with five contact fingers which can be broken away individually to provide the configurations shown in FIG. 6. Socket 160 is provided with contacts 162$^a$–162$^e$ which mate with remaining contact fingers on contact member 80$^a$. A second set of contacts 164$^a$ to 164$^e$ mates with contact fingers on contact member 80$^b$ and a third set of contacts 166$^a$–166$^e$ mates with contact fingers on contact member 80$^c$. A suitable potential source represented by the symbol (E) in FIG. 6 is connected to a selected one of the contacts 162$^a$–162$^e$. In the example chosen for illustration in FIG. 1 the source is connected to contact 162ª. A second contact in the group 162ª to 162ᵉ is connected to a selected one of the contacts in the group 164ª–164ᵉ. In this instance a connection is made from contact 162ᶜ to contact 164ᵇ. A similar connection is made from contact 164ᶜ in the group 164ª–164ᵉ to contact 166ª in the group 166ª–166ᵉ. An output connection 172 is made to contact 166ᵉ in the group 166ª–166ᵉ. The active contacts in the three groups are chosen so that the pair of active contacts in the group 162ª–162ᵉ mate with the contact fingers of member 80ª and hence are bridged by the member 80ª. Similarly the two active contacts in the second group are bridged by member 80ᵇ and the two active contacts in the third group are bridged by contact member 80ᶜ. This establishes a connection between the source (E) and the output connection 172. Again the output connection 172 of the interlock circuit of FIG. 6 may be so connected to the test equipment that operation of the equipment cannot be initiated until output lead 172 is properly energized. The three contact members 80ª, 80ᵇ and 80ᶜ in FIG. 6 each having two contact fingers in two of five possible positions permits 1,000 different combinations in the interlock circuit. Hence 1,000 different magazines may be coded to corresponding number of sockets. The addition or subtraction of a contact member and the associated contacts on socket 14 will increase or decrease the total number of different combinations by a factor of ten. It is to be understood that a magazine 16 may be provided with both the contact members 78ª–78ᶜ of FIG. 2 for interlocking with a test controlling record and the contact members 80ª–80ᶜ of FIG. 6 for interlocking with one or more sockets.

The contact members 78ª–78ᶜ of FIG. 2 and 80ª–80ᶜ of FIG. 6 may take forms other than those shown. For example, contact member 78ª of FIG. 2 may be replaced with six permanent contact fingers which mate with contacts 94ª–94ᵉ. Three of these six contact fingers may be connected together internally by means of suitable wires or shaped bus bars. The three unconnected contact fingers will have no effect on the interlock circuit. However the arrangement just described has the disadvantage over the system of FIG. 2 that it is more difficult to set the contact members to the proper code. Also the assembled magazine provides no visual indication of the selected code.

It is to be understood that the invention in its broadest scope is not to be limited to a punched card record or to the particular type of record receiving means 12 shown in the drawing. Other equivalent forms of control records such as printed tapes and magnetic tapes are known in the art and the means for extracting data therefrom is equally well known.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What we claim is:

1. In combination:
   a magazine arranged to receive a plurality of multi-terminal components to be electrically tested, said magazine including:
   (1) a plurality of connections arranged to contact the respective terminals of said components to be tested, and
   (2) additional contact fingers, selected ones of said additional contact fingers being electrically connected together in a manner to identify said magazine,
   a record controlled test set separable from said magazine and having contact means arranged to mate with said connections and said contact fingers on said magazine,
   a test controlling record,
   said test set being further provided with means for receiving said test controlling record,
   said record being provided with test controlling indicia and record identifying indicia, said record receiving means of said record controlled test set including circuit means responsive to said record identifying indicia, and
   means cooperating with said last-mentioned circuit means and said contact fingers of said magazine for providing an indication of a selected correspondence between data represented by said identifying contact fingers and data represented by said record identifying indicia.

2. In combination:
   a magazine arranged to receive a plurality of multi-terminal units to be tested electrically, said magazine including:
   (1) a plurality of connections arranged to contact the respective terminals of said units to be tested, and
   (2) additional contact fingers, selected ones of said additional contact fingers being electrically connected together in a manner to identify said magazine,
   a record controlled test set separable from said magazine and having contact means arranged to mate with said connections and said contact fingers on said magazine,
   a test controlling record,
   said test set being further provided with means for receiving said test controlling record,
   said record being provided with record identifying indicia,
   said record receiving means of said record controlled test set including a plurality of switches, each arranged to assume one state selected from the two states closed and open in response to the presence of selected record identifying indicia at a selected indicia location of said record and to assume the other of said two states in response to the absence of said selected indicia at said selected location, and
   circuit means including said switches and said identifying contact fingers for providing an indication of a selected correspondent between the data represented by said identifying contact fingers and data represented by said record identifying indicia.

3. In combination:
   a magazine arranged to receive a plurality of multi-terminal units to be tested electrically, said magazine including a plurality of connections arranged to contact the respective terminals of said units to be tested,
   said magazine also including a plurality of selectively electrically interconnected contacts arranged in a coded array in a plurality of contact positions to identify said magazine as one of a class,
   a record controlled test set separable from said magazine and having contact means arranged to mate with said connections and said plurality of contacts of said magazine,
   said test set including a contact for each of said plurality of contact positions of said magazine,
   a test controlling record,
   said test set further including means for receiving said test controlling record,
   said record including a plurality of indicia locations, indicia in selected ones of said indicia locations identifying said record as a selected one of a class,
   said test set further including a plurality of switches, each switch corresponding to one of said indicia locations, each of said switches arranged to assume one state selected from the two states closed and open in response to the presence of indicia at the corresponding indicia location and to assume the opposite one of said two states in response to the absence of indicia at the corresponding indicia location, and
circuit means including said switches and said contact means of said test set corresponding to said contact positions of said magazine for providing an indication of a selected correspondence between the data represented by said plurality of contacts of said magazine and data represented by indicia at said selected indicia locations.

4. In combination:
a magazine arranged to receive a plurality of multi-terminal units to be tested electrically, said magazine including a plurality of connections arranged to contact the respective terminals of said units to be tested,
said magazine further including a plurality of selectively electrically interconnected contacts arranged in a coded array in a plurality of contact positions to identify said magazine as a selected one of a class,
a record controlled test set separable from said magazine and having contact means arranged to mate with said connections and said plurality of contacts of said magazine,
said test set including one of said contact means for each of said plurality of contact positions of said magazine,
a test controlling record,
said test set further including means for receiving said test controlling record,
said record being provided with a plurality of indicia locations, indicia in selected ones of said indicia locations identifying said record as a selected one of a class,
said test set further including a plurality of switches, each switch corresponding to one of said indicia locations, each of said switches arranged to be closed in response to the presence of indicia at the corresponding indicia location and to be open in response to the absence of indicia at the corresponding indicia location, and
circuit means including said switches and said contact means of said test set corresponding to said plurality of contact positions of said magazine for providing an indication of a selected correspondence between the data represented by said plurality of contacts of said magazine and data represented by indicia at said selected indicia locations.

5. In combination:
a magazine arranged to receive a plurality of multi-terminal units to be tested electrically,
said magazine including a plurality of connections arranged to contact the respective terminals of said units to be tested,
a record controlled test set separable from said magazine and having a first plurality of contacts arranged to mate with said connections on said magazine,
said test set further including a second plurality of input contacts and an additional contact,
means for supplying a potential to said additional contact,
said magazine further including coded bridging means arranged to mate with said additional contact and selected ones of said second plurality of input contacts, thereby to connect said additional contact to said selected ones of said second plurality of input contacts,
a test controlling record,
said test set further comprising means for receiving said test controlling record,
said record being provided with a plurality of indicia locations, indicia at selected ones of said indicia locations identifying said record as a selected one of a class,
said test set further comprising a plurality of switches, each corresponding to one of said indicia locations, each of said switches arranged to be closed in response to the presence of indicia at the corresponding indicia location and to be opened in response to the absence of indicia at the corresponding indicia location, and
circuit means including said switches and said second plurality of input contacts for providing an indication upon a joint closure of selected ones of said circuit paths and the energization of selected ones of said second plurality of input contacts.

6. In combination:
a magazine arranged to receive a plurality of multi-terminal units to be tested electrically, said magazine including a plurality of connections arranged to contact the respective terminals of said units to be tested,
a record controlled test set separable from said magazine and having
  (1) a first plurality of contacts arranged to mate with said connections on said magazine,
  (2) a plurality of sets of input contacts, and
  (3) an additional contact for each set of input contacts,
means for supplying selected potentials to said additional contacts,
said magazine further including a coded bridging member for each of said sets of input contacts,
each of said bridging members arranged to mate with one of said additional contacts and selected ones of a set of said input contacts, thereby to connect that additional contact to said selected ones of said input contacts,
a test controlling record,
said test set further including means for receiving said test controlling record,
said record being provided with a plurality of indicia locations, indicia at selected ones of said indicia locations identifying said record as a selected one of a class,
said test set further comprising a plurality of switches, each switch corresponding to one of said indicia locations, each of said switches arranged to be closed in response to the presence of indicia at a corresponding indicia location and to be opened in response to the absence of indicia at the corresponding indicia location, and
circuit means including said switches and said plurality of sets of input contacts for providing an indication upon the joint closure of selected ones of said switches and the energization of selected ones of said input contacts.

7. In combination:
(a) a record-controlled test set,
(b) a magazine arranged to receive a plurality of multiterminal units to be tested electrically,
(c) said magazine having a plurality of connections arranged to contact the respective terminals of said multiterminal units to be tested,
(d) said test set having a socket arranged to receive said magazine so that said magazine and said test set can be plugged together and separated, said test set having a first plurality of fixed contacts arranged to contact automatically and mate with the respective connections of said magazine when said test set and said magazine are plugged together,
(e) said magazine further including at least one contact member having a plurality of electrically interconnected contact fingers extending therefrom,
(f) said test set also having a second plurality of fixed contacts arranged to contact automatically and mate with the respective contact fingers of said magazine when said magazine and said test set are plugged together,
(g) at least one of said contact fingers being formed with a frangible area adjacent the base thereof such that said finger can be manually broken away at said frangible area without damage to said magazine.

8. In combination:
(a) a record-controlled test set,
(b) a magazine arranged to receive a plurality of multiterminal units to be tested electrically,
(c) said magazine having a plurality of connections arranged to contact the respective terminals of said multiterminal units to be tested,
(d) said test set having a socket arranged to receive said magazine so that said magazine and said test set can be plugged together and separated, said test set having a first plurality of fixed contacts arranged to contact automatically and mate with the respective connections of said magazine when said magazine and said test set are plugged together,
(e) said magazine further including at least one electrically conductive contact member having a plurality of electrically interconnected contact fingers extending therefrom,
(f) said test set also having a second plurality of contacts arranged to contact automatically and mate with the respective contact fingers of said magazine when said magazine and said test set are plugged together,
(g) a plurality of said contact fingers, each having a frangible area formed adjacent its base such that selected ones of said contact fingers may be manually broken away at said frangible areas to provide a coded identification of said magazine without damage to said magazine.

References Cited by the Examiner

UNITED STATES PATENTS

| | | | |
|---|---|---|---|
| 2,259,738 | 10/1941 | Del Camp | 339—145 X |
| 2,672,593 | 3/1954 | Shenton. | |
| 2,903,529 | 9/1959 | Hanthorn | 324—22 X |
| 2,995,700 | 8/1961 | Warren | 324—22 |
| 3,065,414 | 11/1962 | Sears et al. | 324—73 X |

WALTER L. CARLSON, *Primary Examiner.*

LLOYD McCOLLUM, *Examiner.*